Alexander & Kellogg.
Broom Head.
N° 69,300. Patented Oct. 1, 1867.
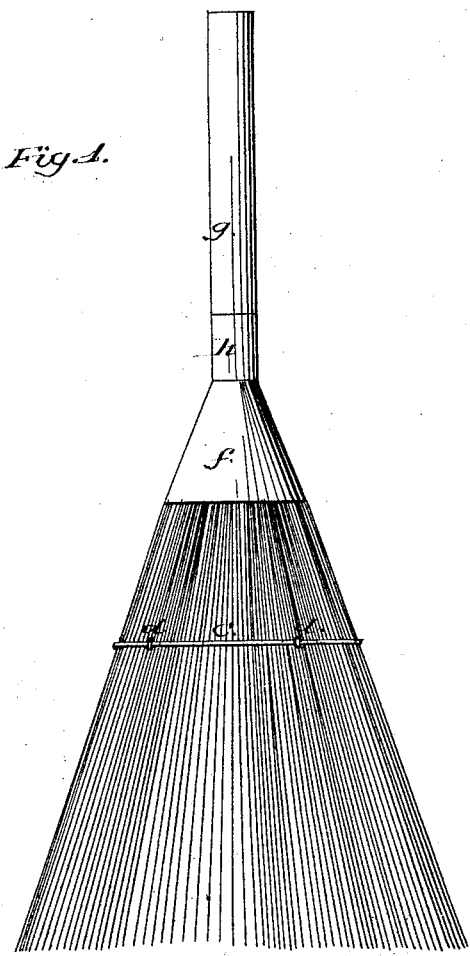
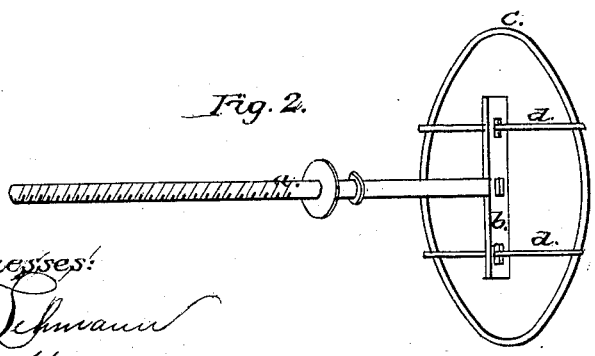
Witnesses:
J. Lehmann
A. A. Yeatman
Inventor:
E. W. Alexander
H. C. Kellogg
per
J. H. Alexander & Co.
Attorneys.

United States Patent Office.

E. A. ALEXANDER AND H. C. KELLOGG, OF INDEPENDENCE, IOWA.

Letters Patent No. 69,300, dated October 1, 1867.

IMPROVED BROOM-HEAD.

*The Schedule referred to in these Letters Patent and making part of the same.*

TO ALL WHOM IT MAY CONCERN:

Be it known that we, E. A. ALEXANDER and H. C. KELLOGG, of Independence, county of Buchanan, and State of Iowa, have invented certain new and useful Improvements in Broom-Heads; and we do hereby declare that the following is a full, clear, and exact description of the same, reference being had to the accompanying drawings, and to the letters of reference marked thereon, in which—

Figure 1 is a side elevation, and

Figure 2 a perspective of the device for clamping and holding the straw or broom-corn.

The object of this invention is to furnish an economical, expeditious, and effective mode of making a broom, at once so simple that its advantages may be enjoyed by every one so disposed.

In order that this may be done, I will now describe its construction and mode of operation.

$a$ represents a metal rod, provided at one end with a thread-screw and at the other with the cross-bar $b$, said bar having three slots cut in it, as shown in fig. 2. $c$ represents a wire loop, and $d\ d$ connecting or supporting hooks, which pass through the slots in cross-bar $b$, and hook to each side of wire loop $c$. $f$ represents a bell or funnel-shaped cap, for covering the upper ends of the broom-corn or straw. $g$ is the handle, which is provided with a hole, in order that it may be screwed upon the rod $a$, as seen in fig. 1. $h$ represents a metal thimble, fitted upon the end of the handle. This thimble should project a little, so as to fit over the end of the cap $f$, to give a better finish.

The operation is simple and apparent. We take the broom-corn and cut it of an equal length. We then tie a cord near the upper ends, pass the rod $a$ through the centre, put on the loop and hooks, then adjust the cap, and screw the handle down tightly. This will draw the loop up and force the cap down, when a perfect and durable broom is made. When the broom becomes worn, replace the broom-corn with new straw.

What we claim, and desire to secure by Letters Patent, is—

The employment of slotted bar $b$, when arranged in combination with hooks $d\ d$, loop $c$, and handle or screw-rod $a$, in the manner and for the purpose set forth.

In testimony that we claim the above we set our signatures in presence of two witnesses.

E. A. ALEXANDER,
H. C. KELLOGG.

Witnesses:
Z. P. TRUMAN,
J. J. MOWRER.